United States Patent
Yamada

(10) Patent No.: US 7,686,389 B2
(45) Date of Patent: Mar. 30, 2010

(54) SEAT APPARATUS FOR VEHICLE

(75) Inventor: Yukifumi Yamada, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 3 days.

(21) Appl. No.: 12/118,996

(22) Filed: May 12, 2008

(65) Prior Publication Data
US 2008/0284223 A1 Nov. 20, 2008

(30) Foreign Application Priority Data
May 18, 2007 (JP) ............................... 2007-132402

(51) Int. Cl.
*B60N 2/36* (2006.01)
(52) U.S. Cl. .................... 297/15; 297/331; 297/334
(58) Field of Classification Search ................... 297/15, 297/331, 334
See application file for complete search history.

(56) References Cited

U.S. PATENT DOCUMENTS

| | | | | |
|---|---|---|---|---|
| 5,839,773 | A * | 11/1998 | Ban et al. | 297/15 X |
| 6,099,072 | A * | 8/2000 | Sturt et al. | 297/15 |
| 6,629,721 | B1 * | 10/2003 | Macey | 297/15 |
| 6,827,394 | B2 * | 12/2004 | Watanabe et al. | 297/15 |
| 7,077,463 | B2 * | 7/2006 | Sun et al. | 297/15 |
| 7,237,837 | B2 * | 7/2007 | Queveau et al. | 297/15 |
| 7,240,950 | B2 | 7/2007 | Fourrey et al. | |
| 2003/0071492 | A1 * | 4/2003 | Watanabe et al. | 297/15 |
| 2006/0103174 | A1 * | 5/2006 | Queveau et al. | 297/15 |
| 2007/0246985 | A1 * | 10/2007 | Sahi | 297/331 |
| 2008/0224518 | A1 * | 9/2008 | Yamada et al. | 297/313 |
| 2008/0284214 | A1 * | 11/2008 | Neale | 297/15 |

FOREIGN PATENT DOCUMENTS

FR 2575708 A1 * 7/1986
JP 2006-123905 5/2006

OTHER PUBLICATIONS

U.S. Appl. No. 12/042,007, filed Mar. 4, 2008, Yukifumi Yamada, et al.

* cited by examiner

*Primary Examiner*—Rodney B White
(74) *Attorney, Agent, or Firm*—Oblon, Spivak, McClelland, Maier & Neustadt, L.L.P.

(57) ABSTRACT

A seat apparatus for a vehicle includes a seat cushion frame for supporting a seat cushion and operated to move between a first position and a second position relative to a vehicle floor, a link member including first and second ends respectively pivotably connected to the vehicle floor and to a first end portion of the seat cushion frame, a guiding member provided at the vehicle floor for supporting a second end portion of the seat cushion frame to the vehicle floor and including a guiding groove, and a sliding member provided at the second end portion of the seat cushion frame and slidably engaged into the guiding groove. The guiding groove extends along a connection line connecting the sliding member and a connection point between the seat cushion frame and the link member so as to move the seat cushion frame between the first position and the second position.

12 Claims, 11 Drawing Sheets

US 7,686,389 B2

SEAT APPARATUS FOR VEHICLE

CROSS REFERENCE TO RELATED APPLICATIONS

This application is based on and claims priority under 35 U.S.C. § 119 to Japanese Patent Application 2007-132402, filed on May 18, 2007, the entire content of which is incorporated herein by reference.

FIELD OF THE INVENTION

The present invention generally relates to a seat apparatus for a vehicle.

BACKGROUND

As one of seat apparatus for a vehicle, JP2006-123905A (hereinafter, referred to as reference 1) discloses a seat apparatus, in which a seat cushion (seat body) and a seatback (back rest) are folded so as to be retracted to a retracted position (retracted state). The seat apparatus for the vehicle disclosed in the reference 1 includes a link mechanism for moving the seat between the retracted position and a seating position (usable state). The link mechanism includes a first connecting rod, which is hinged to a vehicle floor and to the seatback, and a guiding mechanism, which includes a guide secured to the vehicle floor for guiding a lower portion of the seatback.

According to the reference 1, when being in an initial stage for moving the seat body from the usable state to the retracted state, the guide is arranged perpendicularly to a rotational direction of the first connecting rod. Therefore, when moving the lower portion of the seatback along the guide, large slide resistance is generated. Accordingly, there is a requirement for improving movability of the seatback by providing a roller(s) rotatably moving along the guide, for example, hence leading to an increase in cost.

Further, in the seat apparatus for the vehicle disclosed in the reference 1, the seatback and the seat cushion are moved to the retracted position in association with each other with an aid of the link mechanism. Therefore, when adjusting a reclining angle of the seatback, a position of the seat cushion is also changed and furthermore, a seating posture of an occupant of the seat cushion may be changed in accordance with a change of the position of the seat cushion.

A need thus exists for a seat apparatus for a vehicle which is not susceptible to the drawback mentioned above.

SUMMARY OF THE INVENTION

According to an aspect of the present invention, a seat apparatus for a vehicle includes a seat cushion frame, a link member, a guiding member and a sliding member. The seat cushion frame is adapted to support a seat cushion of the vehicle and is operated to move between a first position and a second position relative to a vehicle floor. The link member includes a first end adapted to be pivotably connected to the vehicle floor and a second end pivotably connected to a first end portion of the seat cushion frame for supporting the first end portion of the seat cushion frame to the vehicle floor. The guiding member is adapted to be provided at the vehicle floor for supporting a second end portion of the seat cushion frame to the vehicle floor and includes a guiding groove. The sliding member is provided at the second end portion of the seat cushion frame and is slidably engaged into the guiding groove of the guiding member. The guiding groove extends along a connection line connecting the sliding member and a connection point between the seat cushion frame and the link member so as to move the seat cushion frame between the first position and the second position.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

A first embodiment of the present invention will be described hereinafter with reference to the attached drawings. A seat apparatus for a vehicle according to the first embodiment may be employed, for example, as a rear seat mounted on a backspace in a vehicle such as a van or mini-van. In other words, the seat apparatus for the vehicle is arranged on a vehicle floor 16, which is formed entirely flatly. Hereinafter, directions, such as "longitudinal", "lateral", "vertical", "front/rear", or the like, correspond to an orientation of the vehicle.

Figure 1:
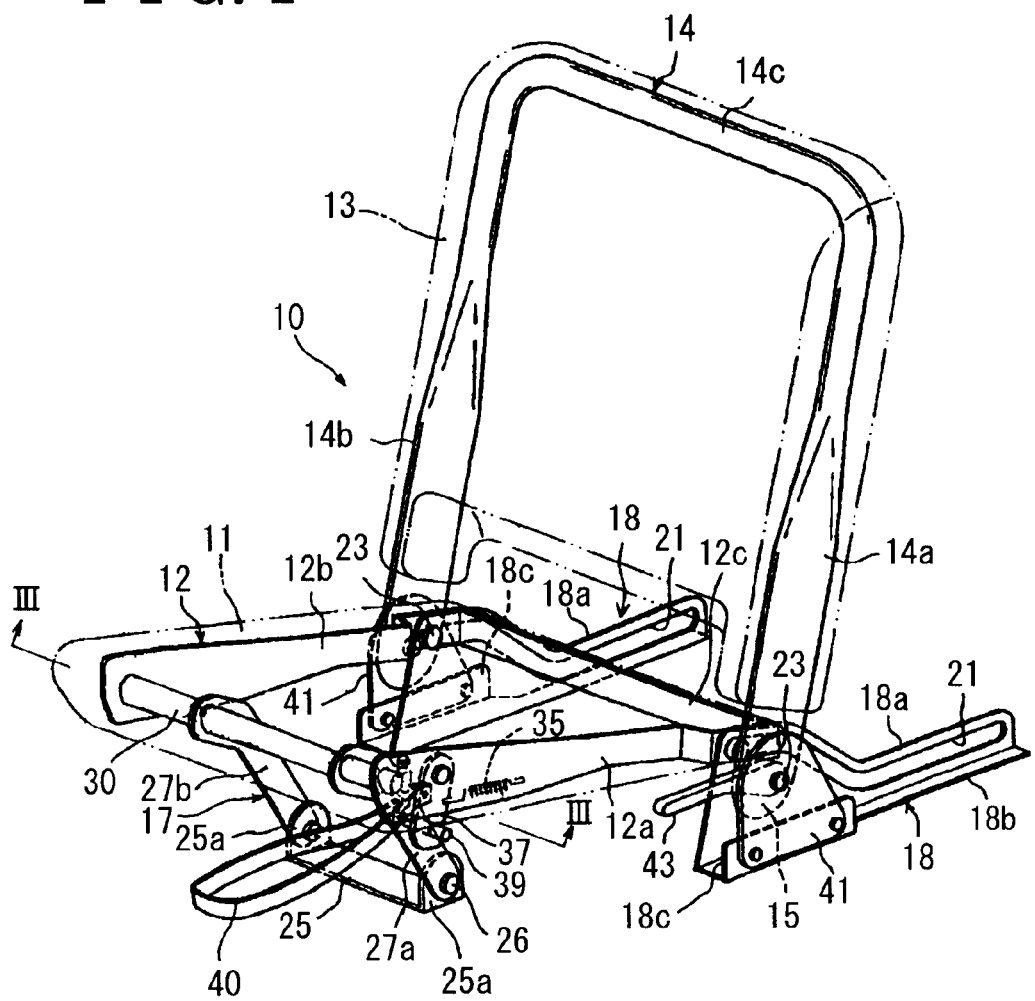
FIG. 1 is a perspective view illustrating a seat apparatus for a vehicle according to a first embodiment, in a state where a seat cushion frame is in a first position thereof and a seatback frame is in a first position thereof.
Figure 2:
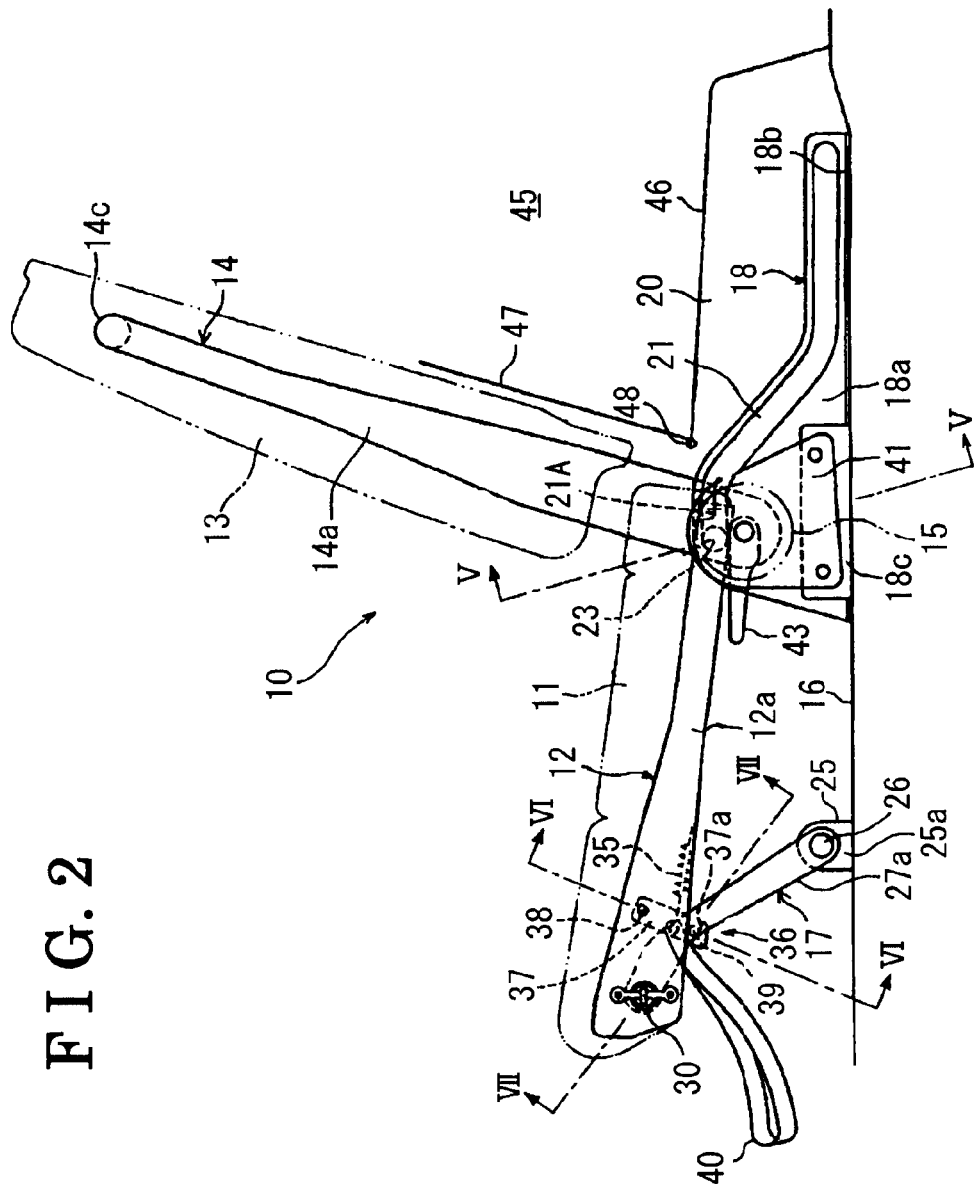
FIG. 2 is a side view illustrating the seat apparatus for the vehicle illustrated in FIG. 1.

As illustrated in FIGS. 1 and 2, the seat apparatus for the vehicle includes a seat cushion frame 12, a seatback frame 14 and a reclining mechanism 15. The seat cushion frame 12 supports a seat cushion 11 of a seat 10 for the vehicle. The seatback frame 14 supports a seatback 13. The reclining mechanism 15 is employed for adjusting a reclining angle of the seatback 13 relative to the seat cushion 11 by forwardly and backwardly pivotably supporting the seatback 13 relative to the seat cushion 11 and by retaining the seatback 13 at a predetermined angle position.

The seat cushion frame 12 includes first and second side frame portions 12a and 12b, which are provided at left and right sides (i.e., sides in a vehicle width direction) of the seat cushion frame 12, respectively, and extend in a longitudinal direction of the vehicle. A rear end portion of each of the side frame portions 12a and 12b is mutually connected to a rear frame portion 12c of the seat cushion frame 12. Thus, the seat cushion frame 12 is formed in an approximately U-shape when viewed from an upper direction of the vehicle.

A front portion of the seat cushion 11 is supported by a link mechanism 17 and a rear portion of the seat cushion 11 is supported by first and second guiding rails 18 serving as a guiding member. Thus, the seat cushion 11 is supported on the vehicle floor 16 so as to be longitudinally movable between a seating position and a retracted position thereof. Herein, the seating position and the retracted position of the seat cushion 11 correspond to a seating position (serving as a first position) and a retracted position (serving as a second position) of the seat cushion frame 12, respectively. When being in the seating position of the seat cushion 11 (i.e., in the first position of the seat cushion frame 12), an occupant is allowed to be seated thereon. On the other hand, when being in the retracted position of the seat cushion 11 (i.e., in the second position of the seat cushion frame 12), the seat cushion 11 is retracted relative to the vehicle floor 16.

The first and second guiding rails 18 are respectively provided at left and right sides of a retracting space 20, which defines the retracted position of the seat cushion 11. Further, a rear end portion of the seat cushion 11 is connectedly supported to the vehicle floor 16 by the first and second guiding rails 18. Each of the first and second guiding rails 18 includes a vertical wall 18a formed in an elongated shape along the longitudinal direction of the vehicle. In a state where the seat cushion 11 is located at the retracted position, the vertical wall 18a of the first guiding rail 18 is arranged to face a left side portion of the seat cushion 11 and the vertical wall 18a of the second guiding rail 18 is arranged to face a right side portion of the seat cushion 11.

Figure 5:
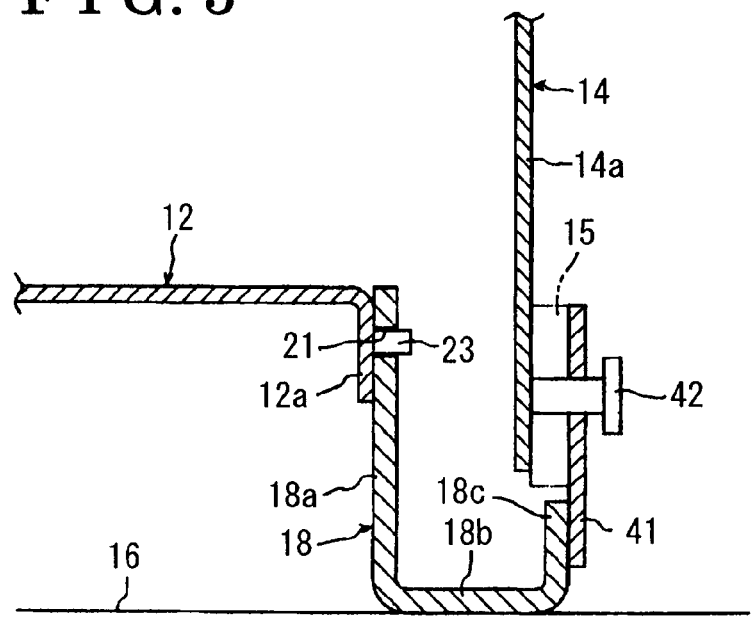
FIG. 5 is a cross sectional view illustrating a guiding member of the seat apparatus taken along line V-V in FIG. 2.

As illustrated in FIG. 5, a fixing portion 18b extends from a lower end portion of each vertical wall 18a in a direction away from the seat cushion 11. Each of the fixing portions 18b of the first and second guiding rails 18 is securely connected to the vehicle floor 16 by a fastener (not illustrated), so that the guiding rails 18 are fixed to the vehicle floor 16.

Further, a guiding groove 21 is formed at the vertical wall 18a of each guiding rail 18 so as to define a path along which the seat cushion 11 is moved between the seating position and the retracted position thereof. Cylindrical sliding protrusions 23 (each serving as a sliding member) are formed at rear end portions of the first and second side frame portions 12a, 12b of the seat cushion frame 12, respectively. Each sliding protrusion 23 of the seat cushion frame 12 is slidably engaged with the corresponding guiding groove 21 of the guiding rail 18. Thus, the rear end portion of the seat cushion 11 is connectedly supported to the vehicle floor 16 via the guiding rails 18.

The link mechanism 17 is employed for connectedly supporting a front end portion of the seat cushion 11 on the vehicle floor 16. The link mechanism 17 includes a fixed member 25 and first and second link members 27a and 27b. The fixed member 25 of the link mechanism 17 is fixed to the vehicle floor 16. Further, first and second supporting portions 25a, 25a are provided at left and right end portions of the fixed member 25, respectively. One longitudinal end (serving as a first end) of each of the first and second link members 27a and 27b is pivotably supported by the corresponding supporting portion 25a of the fixed member 25 via a corresponding supporting shaft 26.

A pipe-shaped torque rod 30 is inserted through and connected to another longitudinal end (serving as a second end) of each of the first and second link members 27a and 27b. Thus, the first and second link members 27a and 27b are mutually connected by the torque rod 30. One axial end (serving as a first end) of the torque rod 30 is provided at a connection point between the first link member 27a and the first side frame portion 12a of the seat cushion frame 12 and is rotatably connected to the front end portion of the first side frame portion 12a of the seat cushion frame 12. Another axial end (serving as a second end) of the torque rod 30 is provided at a connection point between the second link member 27b and the second side frame portion 12b of the seat cushion frame 12 and is rotatably connected to the front end portion of the second side frame portion 12b of the seat cushion frame 12. The torque rod 30 and the seat cushion frame 12 structure a framework of the seat cushion 11. Herein, the front end portion of the seat cushion frame 12 (i.e., of each of the first and second side frame portions 12a, 12b) serves as a first end portion, and the rear end portion of the seat cushion frame 12 (i.e., of each of the first and second side frame portions 12a, 12b) serves as a second end portion.

The guiding groove 21 of the guiding rail 18 is entirely formed in an inclined manner where a frontward portion of the guiding groove 21 is arranged to be away from the vehicle floor 16 and a backward portion of the guiding groove 21 is arranged adjacently to the vehicle floor 16. In other words, the guiding groove 21 is formed to allow the cushion frame 12 to move gradually downwardly as being moved backwardly so as to approach the vehicle floor 16. A front groove portion 21A (serving as an end portion) of the guiding groove 21 is formed to extend along a connection line connecting a center (axial center) M of the torque rod 30 (serving as the connection point between the seat cushion frame 12 and the link member 17), which connects the seat cushion frame 12 with the left and right link members 27a and 27b, and a center N (serving as a predetermined point) of the cylindrical sliding protrusion 23, which is engaged into the guiding groove 21.

More specifically, when the seat cushion 11 is moved from the seating position to the retracted position in accordance with pivotal movement of the first and second link members 27a and 27b, a direction of force acting on each sliding protrusion 23 provided at the seat cushion 11 corresponds to the connection line connecting the center M of the torque rod 30 and the center N of the sliding protrusion 23. Accordingly, by forming the guiding groove 21 to substantially correspond to the connection line connecting the centers M, N of the torque rod 30 and the sliding protrusion 23, slide resistance of the sliding protrusion 23, which is generated when the seat cushion 11 is moved between the seating position and the retracted position thereof, may be reduced to a minimum.

Figure 10:
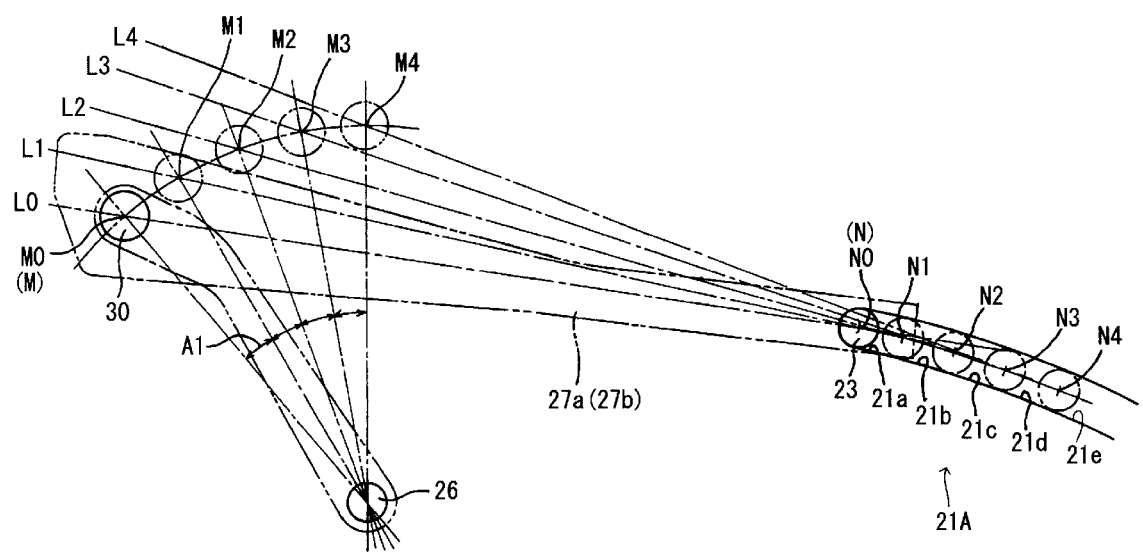
FIG. 10 is an explanatory view illustrating a method for forming a guiding groove of the guiding member.

FIG. 10 is an explanatory view illustrating a method for forming the guiding groove 21. A position of the center M of the torque rod 30 and a position of the center N of the sliding protrusion 23 when the seat cushion 11 is positioned at the seating position thereof are assigned to be a center position M0 and a center position N0, respectively. The connection line connecting the center position M0 of the torque rod 30 and the center position N0 of the sliding protrusion 23 is assigned to be a connection line L0. A groove portion 21a of the guiding groove 21 is formed along the line L0. The position of the center M of the torque rod 30, which is defined by pivoting the link member 27a (27b) in a clockwise direction by a predetermined angle interval A1 from the center position M0 about the supporting shaft 26, is assigned to be a center position M1. The position of the center N of the sliding protrusion 23 when the center M of the torque rod 30 is located at the center position M1 is assigned to be a center position N1. The connection line connecting the center position M1 of the torque rod 30 and the center position N1 of the sliding protrusion 23 is assigned to be a connection line L1. A groove portion 21b of the guiding groove 21 is formed along the connection line L1. In the same manner, the positions of the center M of the torque rod 30, which are defined by pivotally moving the link member 27a (27b) in a clockwise direction by the predetermined angle intervals A1 from preceding positions, are assigned to be M2, M3 and M4, respectively. The positions of the center N of the sliding protrusion 23 defined in association with the center positions M2, M3 and M4 of the torque rod 30 are assigned to be N2, N3 and N4, respectively. Further, connection lines connecting the center positions M2, M3 and M4 of the torque rod 30 and the corresponding center positions N2, N3 and N4 of the sliding protrusion 23 are assigned to be L2, L3 and L4, respectively. Still further, groove portions 21c, 21d and 21e are formed along the connection lines L2, L3 and L4, respectively. As is apparent from FIG. 10, the center positions M0 to M4 (serving as a plurality of first points) are defined on a movement path of the center M of the torque rod 30 (serving as a connection point between the link member 27a/27b and the seat cushion frame 12) and the center positions N0 to N4 (serving as a plurality of second points) are defined on a movement path of the center N of the sliding protrusion 23 in association with the center positions M0 to M4. As described above, the groove portions 21a to 21e are formed along the corresponding connection lines L0 to L4 connecting the center positions M0 to M4 and the center positions N0 to N4, respectively. Then, the guiding groove 21 is formed by continuously (smoothly) connecting the groove portions 21a, 21b, 21c, 21d and 21e, thus exhibiting an arced groove. In order to form the guiding groove 21 with which the slide resistance of the sliding protrusion 23 is accurately reduced, the predetermined angle interval A1 is defined to be smaller. The smaller the predetermined angle interval A1 is defined, the greater number of groove portions may be defined to form the guiding groove 21.

An entire length of the guiding groove 21 may not necessarily be formed in the above described manner so as to correspond to the aforementioned connection lines connecting the center positions of the torque rod 30 and the center positions of the sliding protrusion 23. In other words, by forming only the front groove portion 21A of the guiding groove 21 in the above described manner, the slide resistance of the sliding protrusion 23 is effectively reduced. So configured, when the movement of the seat cushion 11 from the seating position towards the retracted position is started, the sliding protrusion 23 comparatively readily slides along the guiding groove 21 with an aid of moment of inertia, which is generated when the seat cushion 11 is moved, even if a direction of the guiding groove 21 is slightly differed from the connection lines L0 to L4 connecting the center positions M0 to M4 of the torque rod 30 and the center positions N0 to N4 of the sliding protrusion 23.

Further, the front groove portion 21A of the guiding groove 21, into which the sliding protrusion 23 is engaged when the seat cushion 11 is located at the seating position, may be formed into a horizontal shape for stably supporting load applied to the rear portion of the seat cushion 11. Therefore, there is a requirement for appropriately defining an angle between the vehicle floor 16 and the link member 27a (27b) when the seat cushion 11 is located at the seating position. Still further, a rear groove portion of the guiding groove 21 is arranged to horizontally extend at the vicinity of the vehicle floor 16, so that the seat cushion 11 is retained in parallel with the vehicle floor 16 when the seat cushion 11 is located at the retracted position thereof.

When the seat cushion 11 is retained at the seating position thereof, the sliding protrusion 23 formed at the seat cushion frame 12 is engaged with the front groove portion 21A of the guiding groove 21, thus arranging the rear end portion of the seat cushion 11 to be away from the vehicle floor 16. When the seat cushion 11 is retained at the retracted position thereof, the sliding protrusion 23 is engaged with a rear groove end portion of the guiding groove 21, thus arranging the rear end portion of the seat cushion 11 to be close to the vehicle floor 16.

Figure 3:
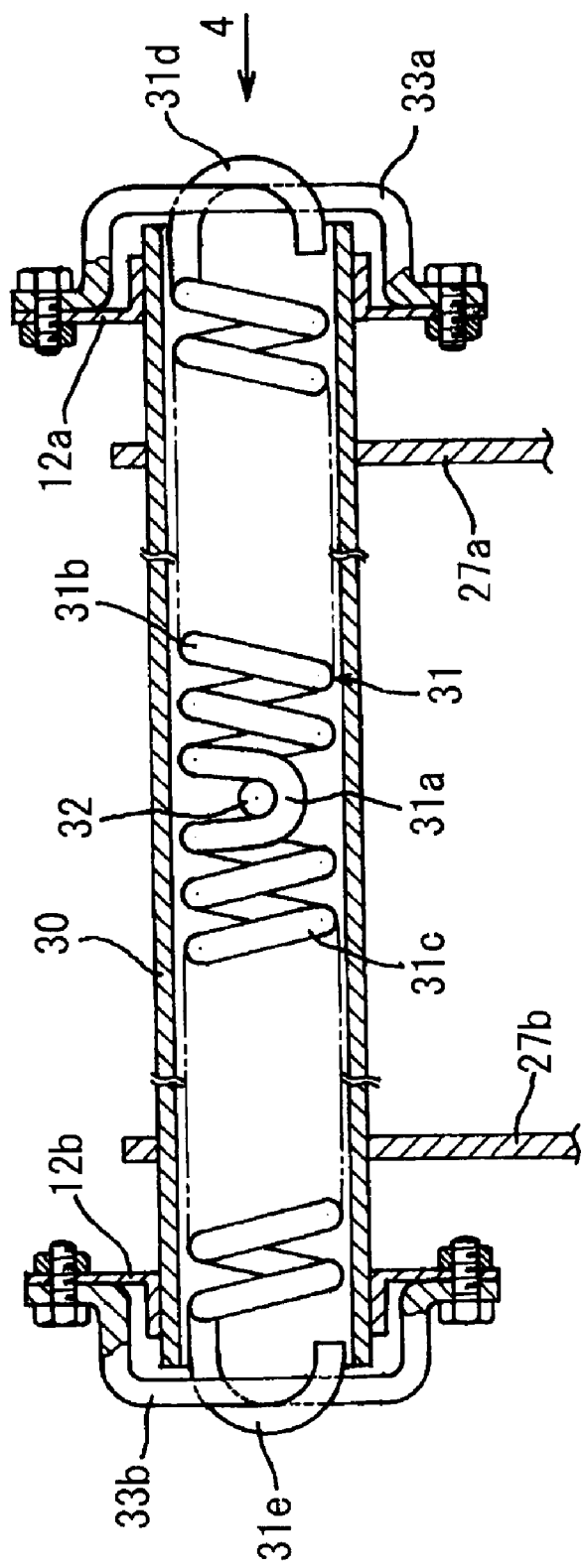
FIG. 3 is a cross sectional view illustrating a torque rod of the seat apparatus taken along line III-III in FIG. 1.
Figure 4:
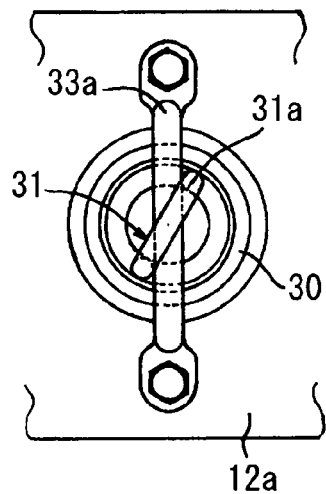
FIG. 4 is a schematic view illustrating the torque rod viewed from an arrow IV in FIG. 3.

As illustrated in FIGS. 3 and 4, a coil spring 31 (serving as a spring) is inserted into the pipe shaped torque rod 30. A central engagement portion 31a (serving as an intermediate portion) is provided at an axially central portion of the coil spring 31. The central engagement portion 31a is engaged with an engagement pin 32, which is radially inserted at a longitudinally central portion of the torque rod 30 and secured thereat. Further, the coil spring 31 includes a first coil portion 31b and a second coil portion 31c. The first coil portion 31b extends from the central engagement portion 31a in a first axial direction towards a first open portion (left side of the seat apparatus) of the torque rod 30 and is wound in a first wound direction (in a clockwise direction, for example). The second coil portion 31c extends from the central engagement portion 31a in a second axial direction towards a second open portion (right side of the seat apparatus) of the torque rod 30 and is wound in a second wound direction (in a counterclockwise direction, for example), which is an inverted direction of the first wound direction.

First and second end portions of the coil spring 31 are respectively provided with first and second engagement portions 31d and 31e, each of which exhibits a hook shape. First and second hook engagement members 33a and 33b are secured at the first and second side frame portions 12a and 12b of the seat cushion frame 12, respectively. The first engagement portion 31d of the coil spring 31 is engaged with the first hook engagement member 33a in a manner where torsion torque and axial tensile force are applied to the first coil portion 31b. The second engagement portion 31e of the coil spring 31 is engaged with the second hook engagement member 33b in a manner where the torsion torque and the tensile force, both of which act in the same direction of those applied to the first coil portion 31b, are applied to the second coil portion 31c.

So configured, the first side frame portion 12a of the seat cushion frame 12 receives biasing force for moving the seat cushion frame 12 towards the retracted position of the seat cushion 11 by the torsion torque of the first coil portion 31b. At the same time, the second side frame portion 12b of the seat cushion frame 12 receives the biasing force for moving the seat cushion frame 12 towards the retracted position of the seat cushion 11 by the torsion torque of the second coil portion 31c, which acts in the same direction of the torsion torque of the first coil portion 31b. Thus, the seat cushion 11 is moved from the seating position toward the retracted position thereof with an aid of the biasing force evenly applied between the left and right sides of the seat cushion 11.

When being at the seating position of the seat cushion 11, the first and second link members 27a and 27b of the seat cushion frame 12 support the seat cushion 11 in a standing manner between the seat cushion 11 and the vehicle floor 16. Further, when the seat cushion 11 is moved from the seating position to the retracted position thereof, the first and second link members 27a and 27b are pivotally moved in the backward direction of the vehicle in accordance with the backward movement of the seat cushion 11, thus moving the front end portion of the seat cushion 11 to approach the vehicle floor 16.

Figure 6:
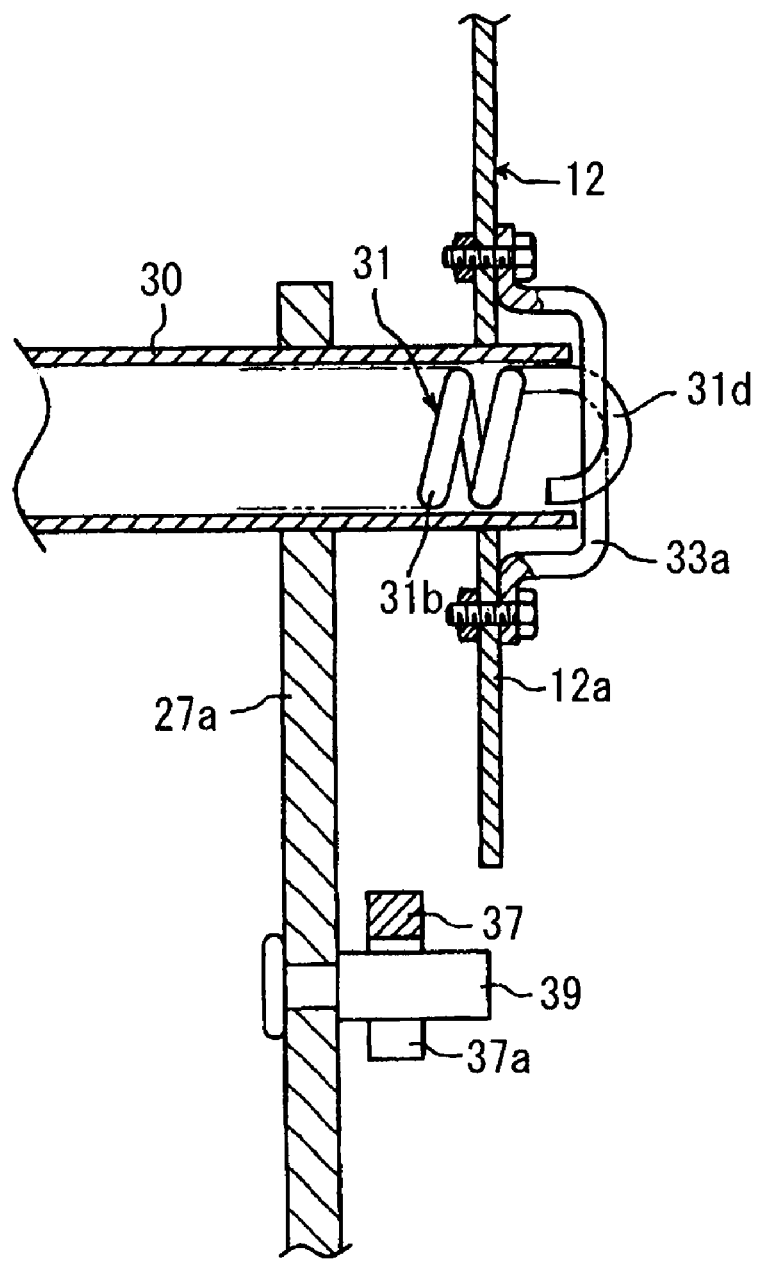
FIG. 6 is a cross sectional view illustrating a link mechanism of the seat apparatus taken along line VI-VI in FIG. 2.
Figure 7:
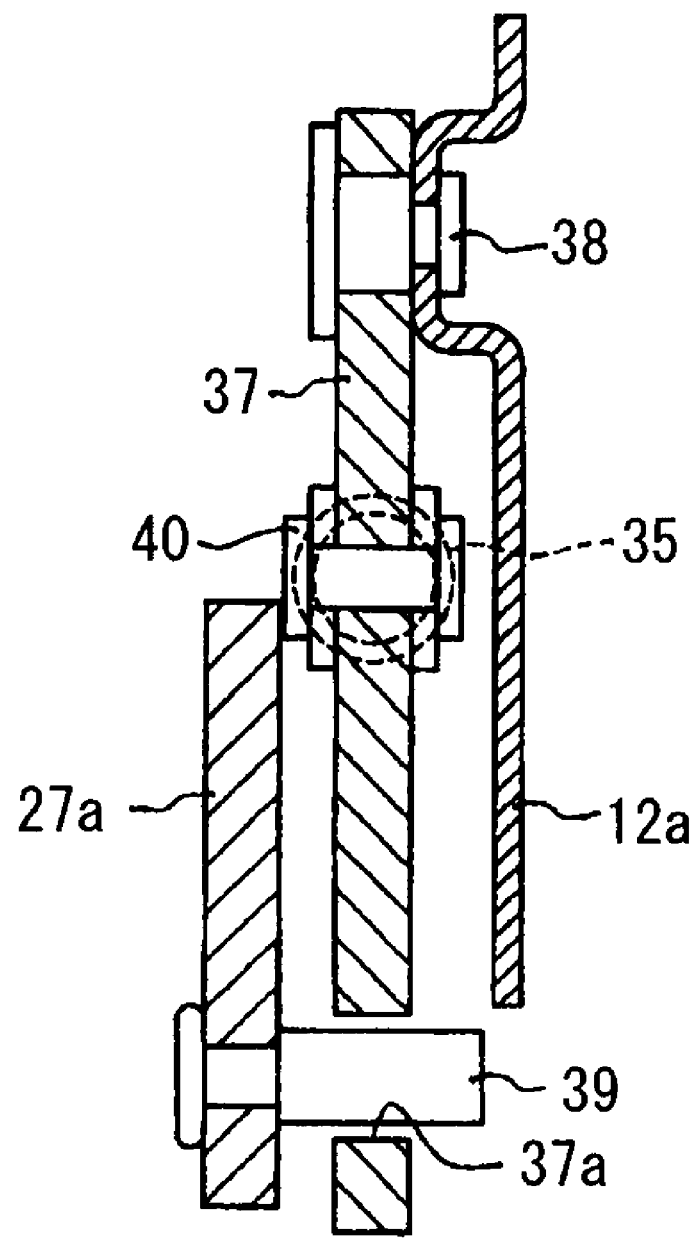
FIG. 7 is a cross sectional view illustrating the link mechanism of the seat apparatus taken along line VII-VII in FIG. 2.

Back to FIG. 2, a restraining member 36 is provided between the seat cushion 11 and the link mechanism 17. The restraining member 36 restrains the seat cushion 11 at the seating position 11. Further, the restraining member 36 includes a ratchet 37 exhibiting an elongated plate shape. As best shown in FIGS. 6 and 7, one longitudinal end portion (upper end portion) of the ratchet 37 is rotatably connected to the first side frame portion 12a of the seat cushion frame 12 via a supporting shaft 38. Further, another longitudinal end portion (lower end portion) of the ratchet 37 is provided with a cutout 37a, which opens in the backward direction of the vehicle. When the seat cushion frame 12 is retained at the seating position of the seat cushion 11, a cylindrical locking protrusion 39, which is provided at the first link member 27a, is engaged into the cutout 37a of the ratchet 37 (see FIG. 7).

Further, back to FIGS. 1 and 2, a spring 35 is provided between the ratchet 37 and the first side frame portion 12a. The ratchet 37 of the restraining member 36 is biased in the backward direction of the vehicle (i.e., in a direction where the locking protrusion 39 is engaged into the cutout 37a of the ratchet 37) by means of the spring 35. When the locking protrusion 39 provided at the first link member 27a is engaged into the cutout 37a of the ratchet 37, pivotal movement of the first and second link members 27a and 27b towards the backward direction of the vehicle is restrained, hence restraining and retaining the seat cushion 11 at the seating position thereof.

Further, a string type operating member 40 is connected to a longitudinally intermediate portion of the ratchet 37. When the operating member 40 is pulled in the front direction of the vehicle against the biasing force of the spring 35, the ratchet 37 is forwardly rotated about the supporting shaft 38 as a rotational center, thus releasing an engagement between the cutout 37a of the ratchet 37 and the locking protrusion 39 of the link member 27a. Thus, when the engagement between the cutout 37a and the locking protrusion 39 is released, the first and second link members 27a and 27b of the cushion frame 12 are allowed to pivot in the backward direction of the vehicle, hence allowing the seat cushion 11 to move to the retracted position thereof.

Further, a plate shaped connecting wall 18c is provided at each of the first and second guiding rails 18. More specifically, as best shown in FIGS. 1 and 5, each connecting wall 18c is formed at a longitudinal front portion of the fixing portion 18b and extends upwardly from an outer end thereof, which is opposite to the end (inner end) where the vertical wall 18a is formed. Further, a lower end portion of a plate shaped connecting plate 41 is securely connected to each of the connecting portions 18c. The connecting plate 41 is employed for pivotably supporting the seatback 13 to the vehicle floor 16.

The seatback 13 includes the seatback frame 14 serving as a framework structuring the seatback 13. The seatback frame 14 includes first and second side frame portions 14a, 14b and an upper frame portion 14c. The first and second side frame portions 14a and 14b, each of which extends in a height direction of the seatback 13, are provided at left and right portions of the seatback 13 (i.e., side portions in a width direction of the seatback 13), respectively. The upper frame portion 14c is provided at an upper end portion of the seatback 13 along the width direction of the seatback 13. The upper frame portion 14c connects upper end portions of the first and second frame portions 14a and 14b. Thus, the seatback frame 14 is formed in a U shape when viewed in a front view.

A lower end portion of the first side frame portion 14a of the seatback frame 14 is provided between the left connecting plate 41 and the vertical wall 18a of the first guiding rail 18 at the left side of the seatback 13. In the same manner, a lower end portion of the second side frame portion 14b is provided between the right connecting plate 41 and the vertical wall 18a of the second guiding rail 18 at the right side of the seatback 13. Further, the first and second side frame portions 14a and 14b are pivotably supported to the corresponding connecting plates 41 via corresponding support shafts 42 (see FIG. 5), respectively. The known reclining mechanism 15 is provided between one of the first and second side frame portions 14a and 14b (in the first embodiment, the first side frame portion 14a) and the corresponding connecting plate 41, thus supporting the seatback frame 14 to the connecting plate 41 via the reclining mechanism 15. Though not illustrated in the drawings, a lock mechanism, which restrains a pivotal movement of the seatback 13 relative to the seat cushion 11 and releases the restriction of the pivotal movement of the seatback 13, is provided at the reclining mechanism 15. By operating an operation lever 43 provided at the reclining mechanism 15, the lock mechanism is switched between a locked state, in which the pivotal movement of the seatback 13 relative to the seat cushion 11 is restrained, and an unlocked state, in which a restriction of the pivotal movement of the seatback 13 is released.

Figure 8:
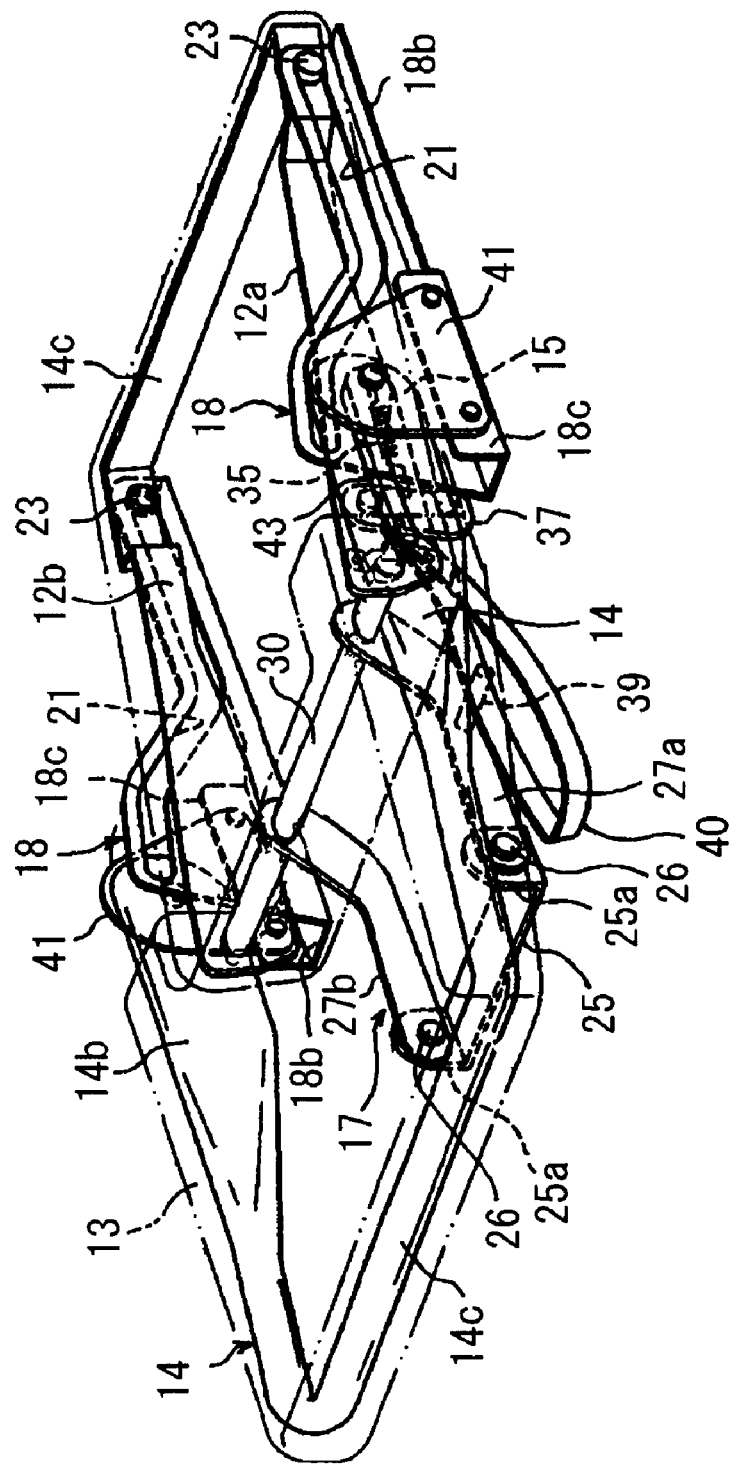
FIG. 8 is a perspective view illustrating the seat apparatus for the vehicle according to the first embodiment, in a state where the seat cushion frame is in a second position thereof and the seatback frame is in a second position thereof.
Figure 9:
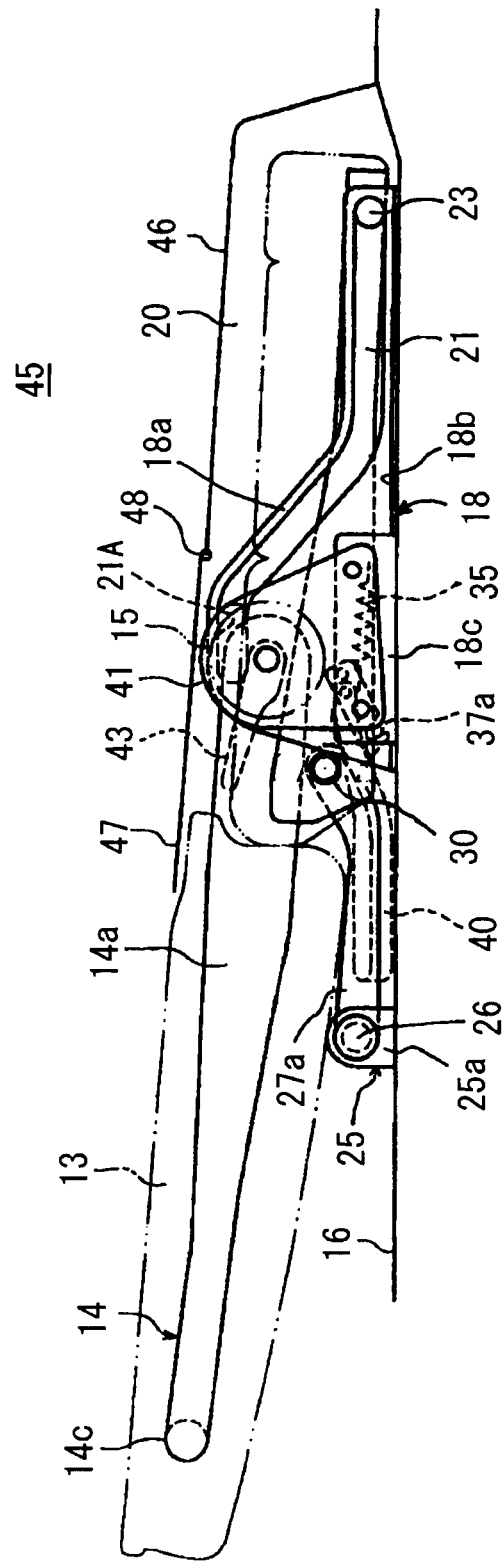
FIG. 9 is a side view illustrating the seat apparatus for the vehicle illustrated in FIG. 8.

The seatback 13 is pivotably moved between a standing position and a forwardly reclined position. The standing position and the forwardly reclined position of the seatback 13 correspond to a standing position (serving as a first position) and a forwardly reclined position (serving as a second position) of the seatback frame 14, respectively. When being in the standing position of the seatback 13 (i.e., in the first position of the seatback frame 14) as illustrated in FIGS. 1 and 2, the seat cushion 11 is retained at the seating position and a back of an occupant seated thereon is supported by the seatback 13. When being in the forwardly reclined position of the seatback 13 (i.e., in the second position of the seatback frame 14) as illustrated in FIGS. 8 and 9, the seatback 13 is arranged at a front side of the seat cushion 11 located at the retracted position thereof. In a state where the seatback 13 is located at the forwardly reclined position, the seatback 13 and the seat cushion 11 are arranged (folded) longitudinally flatly.

The retracting space 20 for retracting the seat cushion 11 is provided at a lower side of a deck board 46 structuring a floor portion of a luggage compartment 45. As illustrated in FIG. 9, height of the back surface of the seatback 13 located in the forwardly reclined position is arranged to be approximately the same height of an upper surface of the deck board 46.

A pivoting board 47 is pivotably connected at a front end portion (an end portion adjacent to the seatback 13) of the deck board 46 via a hinge pin 48. The pivoting board 47 is retained in a standing manner along the back surface of the seatback 13 when the seatback 13 is retained at the standing position thereof. The pivoting board 47 is biased in the front direction of the vehicle (i.e., in a direction where the seatback 13 is located) by a biasing member (not illustrated). When the seatback 13 is pivoted in the front direction of the vehicle, the pivoting board 47 of the deck board 46 is forwardly pivoted in accordance with the pivotal movement of the seatback 13. Further, the pivoting board 47 is retained in a position to cover a space between a back surface of the seatback 13 and the deck board 46 when the seatback 13 is located in the forwardly reclined position. Thus, the back surface of the seatback 13, the upper surface of the pivoting board 47 and an upper surface of the deck board 46 structure a continuous floor surface.

Next, an operation of the seat apparatus for the vehicle according to the first embodiment will be described hereinafter. As illustrated in FIGS. 1 and 2, when the operating member 40 is pulled in the front direction of the vehicle against the biasing force of the spring 35 when the seat cushion 11 is retained in the seating position, the ratchet 37 is pivoted in the front direction of the vehicle about the supporting shaft 38, thus releasing an engaged state between the cutout 37a of the ratchet 37 and the locking protrusion 39 of the first link member 27a. Therefore, the link members 27a and 27b are allowed to pivot in the backward direction of the vehicle. In such a condition, the first and second link members 27a and 27b of the cushion frame 12 are pivoted backwardly about the supporting shaft 26 by the biasing force of the coil spring 31 inserted into the torque rod 30, thus moving the seat cushion 11 towards the retracted position from the seating position thereof.

At this time, because the guiding groove 21 formed at the guiding rail 18 is formed along the connection line connecting the center M of the torque rod 30 and the center N of the sliding protrusion 23, the slide resistance of the sliding protrusion 23, which is generated when the movement of the seat cushion 11 from the seating position towards the retracted position is started, may be arranged to be small, thus smoothly starting the movement of the seat cushion 11. In addition, the left and right sides of the seat cushion 11 (i.e., the first and second side frame portions 12a and 12b of the seat cushion frame 12) are biased towards the retracted position from the seating position with the even force by the first and second coil portions 31b and 31c of the coil spring 31. Therefore, the seat cushion 11 is stably moved from the seating position to the retracted position without being inclined relative to the guiding rail 18.

The sliding protrusion 23 provided at the rear end portion of the seat cushion frame 12 is moved along the guiding groove 21 formed at the guiding rail 18 in accordance with the movement of the seat cushion 11 towards the retracted position. Thus, the rear end portion of the seat cushion frame 12 is downwardly moved to approach the vehicle floor 16. At the same time, the front end portion of the seat cushion frame 12 is also downwardly moved towards the vehicle floor 16 in accordance with a backwardly reclining movement of the first and second link members 27a and 27b. Thus, as illustrated in FIG. 9, the sliding protrusion 23 of the seat cushion frame 12 is backwardly moved to the retracted position until reaching the rear end portion of the guiding groove 21 of the guiding rail 18. In such a state, the first and second link members 27a and 27b are completely tilted down to a backside of the fixing member 25, and the front end portion of the seat cushion frame 12 is arranged adjacently to the vehicle floor 16. Thus, the seat cushion frame 12 is arranged adjacently to the vehicle floor 16 so as to be in parallel thereto.

When the lock mechanism (not illustrated) of the reclining mechanism 15 is switched to the unlocked state by operating the operation lever 43 under such condition where the seat cushion frame 12 is located at the retracted position, the seatback 13 is forwardly pivoted by the biasing force of the spring (not illustrated) incorporated in the reclining mechanism 15, thus moving the seatback 13 to the forwardly reclined position thereof (FIGS. 8 and 9) so as to be arranged at the front side of the seat cushion 11 moved to the retracted position. Thus, the seatback 13 and the seat cushion 11 are longitudinally continuously arranged so as to be retracted beneath the deck board 46 in a flat manner.

On the other hand, in order to return the seat cushion 11 from the retracted position (see FIGS. 8 and 9) to the seating position (see FIGS. 1 and 2), the seatback 13 is pivoted from the forwardly reclined position to the standing position firstly. Then, when the operating member 40 is grasped and pulled forwardly, the seat cushion 11 is pulled forwardly via the ratchet 37. Accordingly, the first and second link members 27a and 27b of the seat cushion frame 12 are pivoted in the counterclockwise direction in FIG. 9 about the supporting shaft 26 and the sliding protrusions 23 provided at the corresponding link members 27a, 27b of the seat cushion frame 12 are moved forwardly along the corresponding guiding grooves 21 of the first and second guiding rails 18. Thus, the seat cushion 11 is moved upwardly while being moved forwardly. When the operating member 40 is released under a condition where each sliding protrusion 23 of the seat cushion frame 12 reaches, or is engaged with, a front end portion of the guiding groove 21 of the guiding rail 18 by the forward movement of the seat cushion 11, the ratchet 37 is pivoted by the biasing force of the spring 35. Then, the cutout 37a of the ratchet 37 is engaged with the locking protrusion 39 provided at the first link member 27a, thus restraining and retaining the seat cushion 11 at the seating position thereof, as illustrated in FIGS. 1 and 2.

According to the first embodiment, the seat apparatus includes the first and second link members 27a and 27b, each of which the first end is pivotably connected to the vehicle floor 16 and the second end is pivotably connected to the front end portion of the seat cushion frame 12, the first and second guiding rails 18 each of which is arranged on the vehicle floor 16 and is provided with the guiding groove 21 defining the path between the seating position and the retracted position of the seat cushion 11, and the sliding protrusions 23 each of which is provided at the rear end portion of the seat cushion frame 12 and is slidably engaged with the guiding groove 21 of the corresponding guiding rail 18. Further, the guiding groove 21 of each guiding rail 18 is formed along the connection line connecting the sliding protrusion 23 and the connection point between the link member 27a (27b) and the seat cushion frame 12 (i.e., the center M of the torque rod 30). Therefore, the slide resistance of the sliding protrusion 23 when the movement of the seat cushion 11 from the seating position towards the retracted position is started may be reduced. Further, the seat cushion 11 is smoothly moved by a small operational force. Still further, the position of the seat cushion 11 (i.e., a posture of an occupant seated on the seat cushion 11) may not be changed even when a reclining angle of the seatback 13 is adjusted.

Further according to the first embodiment, the pipe shaped torque rod 30 is provided at the connection point between the link member 27a (27b) and the seat cushion frame 12. Further, the spring 31, with which the biasing force for moving the seat cushion 11 towards the retracted position is evenly applied between the left and right sides of the seat cushion 11, is inserted into the torque rod 30. Therefore, the seat cushion 11 is smoothly moved to the retracted position with an aid of the biasing force of the spring 31 without inclining the seat cushion 11 relative to the guiding rail 18.

Next, a second embodiment of the present invention will be described hereinafter with reference to FIGS. 11, 12 and 13.

In the second embodiment, a space S is defined between the guiding groove 21 of the guiding rail 18 and a sliding protrusion, which is indicated by the reference numeral 123, and the space S is omitted when the seat cushion 11 reaches the seating position and the retracted position, which is different from the first embodiment. The sliding protrusion 123 smoothly slides through a guiding groove 51 of the guiding rail 18 by the space S provided between the guiding groove 21 and the sliding protrusion 123. Further, by omitting the space S at the seating position and the retracted position of the seat cushion 11, backlash in the lateral direction and the vertical direction of the seat cushion 11 is prevented from being generated, thus preventing noise from being generated. Further, each sliding protrusion 123 is elastically engaged with first and second elastically bent portions 50c, which will be described in detail later, when each sliding protrusion 123 reaches the front and rear end portions of the guiding groove 21. Therefore, a position for starting the movement of the seat cushion 11 from the seating position towards the retracted position, or from the retracted position towards the seating position, is stably retained, thus smoothly moving the seat cushion 11.

Figure 11:
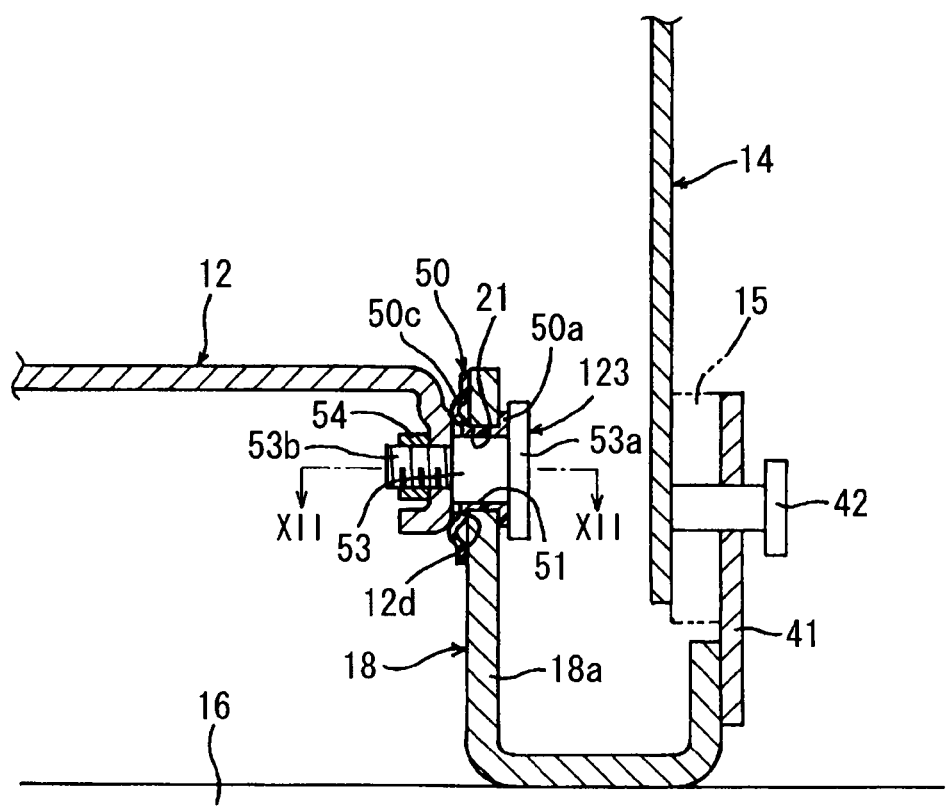
FIG. 11 is a cross sectional view illustrating the sat apparatus for the vehicle according to a second embodiment.
Figure 12:
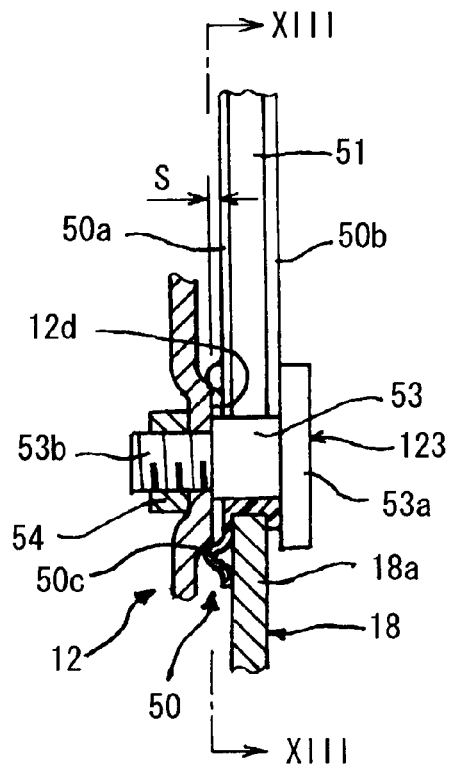
FIG. 12 is a cross sectional view illustrating a sliding member of the seat apparatus, taken along line XII-XII in FIG. 11.
Figure 13:
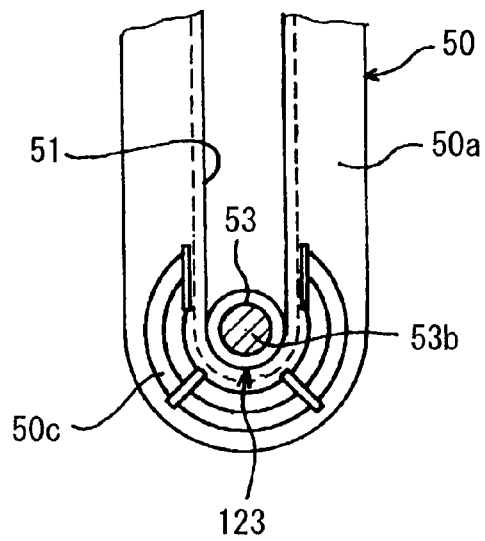
FIG. 13 is a cross sectional view illustrating the sliding member and a guide shoe, taken along line XIII-XIII in FIG. 12.

More specifically, as illustrated in FIGS. 11 and 12, a guide shoe 50 is assembled on the guiding groove 21 of each of the first and second guiding rails 18. The guide shoe 50 extends along the guiding groove 21 defining the path between the seating position and the retracted position of the seat cushion 11. Further, the guiding groove 51, with which the sliding protrusion 123 is slidably engaged, is formed at the guide shoe 50. The sliding protrusion 123 will be described more in detail later. The guide shoe 50 is made by resin. Further, collar portions 50a and 50b (see FIG. 12) are provided along entire length of the guide shoe 50. The collar portions 50a and 50b are engaged with both inner and outer end surfaces of the vertical wall 18a of the guiding rail 18, respectively. Thus, the guide shoe 50 sandwiches the vertical wall 18a of the guiding rail 18 by means of the collar portions 50a and 50b thereby retaining the vertical wall 18a.

The sliding protrusion 123 is assembled on the rear portion of the seat cushion frame 12. The sliding protrusion 123 inserts through the guiding groove 51 formed at the guide shoe 50. Further, a cylindrical portion 53 is formed at the sliding protrusion 123. The cylindrical portion 53 is slidably engaged into the guiding groove 51 of the guide shoe 50 while a slight space is defined between the guiding groove 51 and the cylindrical portion 53. A flange portion 53a is formed at an outer end of the cylindrical portion 53 (i.e., at a right end in FIGS. 11 and 12) so as to contact with the collar portion 50a of the guide shoe 50. Further, a thread portion 53b is formed at an inner end of the cylindrical portion 53 (i.e., at a left end in FIGS. 11 and 12) so as to insert through the rear portion of the seat cushion frame 12.

A circular assembling surface 12d is formed at the rear portion of the seat cushion frame 12. The assembling surface 12d protrudes towards laterally outside of the seat cushion frame 12. One end of the cylindrical portion 53 of the sliding protrusion 123 contacts the assembling surface 12d of the seat cushion frame 12 after inserting through the guiding groove 51 of the guide shoe 50. Then, the sliding protrusion 123 is secured to the assembling surface 12d formed at the rear portion of the seat cushion frame 12 by means of a nut 54, which is threaded to the thread portion 53b formed at the cylindrical portion 53 of the sliding protrusion 123. Therefore, as illustrated in FIG. 12, the space S is provided between the guide shoe 50 and the assembling surface 12d of the seat cushion frame 12, or between the guide shoe 50 and the flange portion 53a, while the seat cushion 11 is moved. Thus, the sliding protrusion 123 of the seat cushion frame 12 smoothly slides through the guiding groove 51 formed at the guide shoe 50.

The first and second elastic bent portions 50c are provided at front and rear end portions of the collar portion 50a of the guide shoe 50, respectively (only one elastic bent portion 50c is illustrated in the drawings as an example). As illustrated in FIG. 13, each of the first and second elastic bent portions 50c is formed in an arc shape so as to protrude towards the assembling surface 12d of the seat cushion frame 12. More specifically, back to FIG. 12, the assembling surface 12d of the seat cushion frame 12 is formed to contact an inner side of an edge line of the first elastic bent portion 50c when the seat cushion 11 reaches the seating position thereof. In the same manner, the assembling surface 12d contact an inner side if an edge line of the second elastic bent portion 50c when the seat cushion 11 reaches the retracted position thereof. Then, the first and second elastic bent portions 50c of the guide shoe 50 are elastically engaged with the assembling surface 12d of the seat cushion frame 12 so as to surround the assembling surface 12d at the seating position and the retracted position of the seat cushion 11, respectively. Therefore, when the seat cushion 11 is located at the seating position and the retracted position thereof, the space S is omitted so that the backlash in the lateral direction and the vertical direction of the sliding protrusion 123 of the seat cushion 11 is prevented.

Thus, the backlash in the vertical direction and the lateral direction of the seat cushion 11 is prevented by the first and second elastic bent portions 50c provided at the front and rear end portion of the guiding groove 51 of the guide shoe 50 at the seating position and the retracted position of the seat cushion 11, thus preventing the noise from being generated. Further, while the seat cushion 11 is moved between the seating position and the retracted position, the space S is formed, thus smoothly sliding the sliding protrusion 123 of the seat cushion frame 12 through the guiding groove 51 of the guide rail 18.

According to the second embodiment, the guide shoe 50 including the guiding groove 51 is assembled on the guiding rail 18. Further, the first and second elastic bent portions 50c, which are elastically engaged with the seat cushion frame 12 at the seating position and the retracted position of the seat cushion 11 so as to omit the space S between the guide shoe 50 and the seat cushion frame 12, are formed at the guide shoe 50. Therefore, the backlash of the seat cushion 11 at the seating position and the retracted position of the seat cushion 11 is prevented, hence preventing the noise from being generated.

Further according to the second embodiment, the space S is defined between the guide shoe 50 and the seat cushion frame 12 while the seat cushion 11 is moved between the seating position and the retracted position. Therefore, the seat cushion 11 is smoothly moved between the seating position and the retracted position thereof.

Still further according to the second embodiment, the assembling surface 12d, which protrudes towards an inner side of the edge line of the elastic bent portion 50c of the guide shoe 50 so as to contact therewith, is formed around the sliding protrusion 123 of the seat cushion frame 12. Therefore, the backlash of the sliding protrusion 123 of the seat cushion 11 in the vertical direction and the lateral direction is prevented from being generated.

According to the first and second embodiments, the seat cushion 11 is forwardly and backwardly moved between the seating position and the retracted position. Further, the seatback 13 is forwardly and backwardly pivotally moved between the standing position and the forwardly reclined position. Moving direction of the seat cushion 11 and pivoting direction of the seatback 13 may not necessarily correspond to the front and back direction of the vehicle, respectively.

Additionally, the assembling surface 12d of the seat cushion frame 12 and the elastic bent portion 50c elastically engaged with the assembling surface 12d may not necessarily be formed in the circular shape (arced shape). Alternatively, such components may be formed in an elongated shape, for example.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising:
   a seat cushion frame adapted to support a seat cushion of the vehicle, the seat cushion frame operated to move between a first position and a second position relative to a vehicle floor;
   a link member including a first end adapted to be pivotably connected to the vehicle floor and a second end pivotably connected at a connection point to a first end portion of the seat cushion frame to support the first end portion of the seat cushion frame to the vehicle floor;
   a guiding member adapted to be provided at the vehicle floor to support a second end portion of the seat cushion frame to the vehicle floor and including a guiding groove; and
   a sliding member provided at the second end portion of the seat cushion frame and slidably engaged into the guiding groove of the guiding member,
   wherein the guiding groove extends along a connection line that extends between the sliding member and the connection point between the seat cushion frame and the link member to define a movement path so as to move the seat cushion frame between the first position and the second position.

2. A seat apparatus for a vehicle according to claim 1, wherein
   the first position of the seat cushion frame corresponds to a position of the seat cushion where an occupant is allowed to be seated on the seat cushion,
   and the second position of the seat cushion frame corresponds to a position of the seat cushion where the seat cushion is retracted relative to the vehicle floor.

3. A seat apparatus for a vehicle according to claim 1, wherein
   the guiding groove of the guiding member includes a plurality of groove portions formed along the corresponding connection lines respectively connecting a plurality of first points defined on the movement path of the connection point between the link member and the seat cushion frame cooperatively moving with the pivotal movement of the link member and a plurality of second points defined on a movement path of a predetermined point of the sliding member in association with the plurality of first points, the guiding groove formed by connecting the plurality of groove portions.

4. A seat apparatus for a vehicle according to claim 3, wherein
   the plurality of first points are defined on the movement path of the connection point between the link member and the seat cushion frame by a predetermined angle interval.

5. A seat apparatus for a vehicle according to claim 3, wherein
   the guiding member includes an arced groove formed by the plurality of groove portions continuously connected.

6. A seat apparatus for a vehicle according to claim 3, wherein
   the plurality of groove portions is provided at an end portion of the guiding groove at which the sliding member is engaged when the seat cushion frame is located at the first position.

7. A seat cushion apparatus for a vehicle according to claim 1, further comprising:
   a pipe shaped torque rod including first and second ends rotatably connected to the seat cushion frame, respectively, each of the first and second ends provided at the corresponding connection point between the link member and the seat cushion frame and connected to the link member; and
   a spring inserted into the torque rod and including first and second ends each engaged with the seat cushion frame and an intermediate portion engaged with the torque rod, the spring biasing the seat cushion frame to move towards the second position.

8. A seat apparatus for a vehicle according to claim 1, wherein
   the guiding member includes a guide shoe having the guiding groove, and
   the guide shoe includes a first elastic bent portion elastically engaged with the seat cushion frame when the seat cushion frame is located at the first position thereof and a second elastic bent portion elastically engaged with the seat cushion frame when the seat cushion frame is located at the second position thereof.

9. A seat apparatus for a vehicle according to claim 8, wherein
   a space is provided between the guide shoe and the seat cushion frame when the seat cushion frame is located between the first position and the second position thereof.

10. A seat apparatus for a vehicle according to claim 9, wherein
    the first position of the seatback frame corresponds to a position of the seatback where an occupant is supported by the seatback,
    and the second position of the seatback frame corresponds to a position of the seatback where the seatback is forwardly reclined and arranged longitudinally flatly with the seat cushion.

11. A seat apparatus for a vehicle according to claim 8, further comprising:
    an assembling surface formed around the sliding member of the seat cushion frame and protruding to the first and second elastic bent portions of the guide shoe so as to contact an inner side of an edge line of each of the first and second elastic bent portions.

12. A seat apparatus for a vehicle according to claim 1, further comprising:
    a seatback frame adapted to support a seatback of the vehicle and operated to move between a first position and a second position relative to the vehicle floor,
    wherein the seatback frame is longitudinally arranged with the seat cushion frame when the seatback frame is located at the second position thereof and the seat cushion frame is located at the second position thereof.

* * * * *